United States Patent
Davis et al.

(12) 
(10) Patent No.: US 6,546,404 B1
(45) Date of Patent: Apr. 8, 2003

(54) DATA MIGRATION TOOL

(75) Inventors: Ashley Bryan Adrian Davis, Southam (GB); Paul Mansell, Warwick (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,221

(22) Filed: May 23, 2000

(30) Foreign Application Priority Data

Jan. 29, 2000 (GB) ............................................. 0002019

(51) Int. Cl.[7] .......................... G06F 12/00; G06F 17/30
(52) U.S. Cl. ..................... 707/204; 707/101; 707/104.1
(58) Field of Search ................ 345/700–705, 345/710–713, 817–820, 810–813, 825–831, 724; 707/1–10, 100–104.1, 200–204, 707

(56) References Cited

U.S. PATENT DOCUMENTS

| | | | | |
|---|---|---|---|---|
| 5,499,357 A | * | 3/1996 | Sonty et al. | 707/10 |
| 5,564,037 A | * | 10/1996 | Lam | 707/204 |
| 5,642,505 A | * | 6/1997 | Fushimi | 707/101 |
| 5,659,614 A | * | 8/1997 | Bailey, III | 707/1 |
| 5,765,173 A | * | 6/1998 | Cane et al. | 707/101 |
| 5,832,274 A | * | 11/1998 | Cutler et al. | 717/169 |
| 5,845,285 A | * | 12/1998 | Klein | 707/101 |
| 5,909,540 A | * | 6/1999 | Carter et al. | 714/4 |
| 5,918,229 A | * | 6/1999 | Davis et al. | 707/10 |
| 5,987,506 A | * | 11/1999 | Carter et al. | 709/213 |
| 5,991,753 A | * | 11/1999 | Wilde | 707/2 |
| 6,026,474 A | * | 2/2000 | Carter et al. | 711/202 |
| 6,035,295 A | * | 3/2000 | Klein | 707/6 |
| 6,112,024 A | * | 8/2000 | Almond et al. | 707/203 |
| 6,151,608 A | * | 11/2000 | Abrams | 707/100 |
| 6,157,931 A | * | 12/2000 | Cane et al. | 707/10 |
| 6,161,176 A | * | 12/2000 | Hunter et al. | 713/1 |
| 6,182,212 B1 | * | 1/2001 | Atkins et al. | 713/1 |
| 6,269,382 B1 | * | 7/2001 | Cabrera et al. | 707/203 |
| 6,377,993 B1 | * | 4/2002 | Brandt et al. | 709/227 |

OTHER PUBLICATIONS

IBM, System Application Architecture—Common User Access Advanced Interface Design Guide, First Edition, Jun. 1989, p. 48.*

* cited by examiner

*Primary Examiner*—Greta Robinson
*Assistant Examiner*—Linh Black
(74) *Attorney, Agent, or Firm*—Abdy Raissinia; Bracewell & Patterson, L.L.P.

(57) ABSTRACT

A data migration tool cooperates with a script file defining, for one or more products, one or more criteria for files to be captured to a backup store from a machine to be migrated, an indication of where the files should be stored in the backup store and any criteria for files to be excluded from the backup store. The tool scans a storage medium for the machine to be migrated and retrieves one or more file names. Responsive to file names fitting any product exclusion criteria, the tool skips the files and, responsive to file names fitting any one of the one or more product capture criteria, the tool captures the files to the backup store according to the indication of where the files should be stored.

19 Claims, 7 Drawing Sheets

Target for captured files

<Lotus 123 Documents>
trg 123\work\
cap work\123\*.*
cap *.wk*
cap *.123
exc elan.123
:end Application Title <Freelance Graphics Documents>
trg flg\

Files to capture cap work\flg\*.*
cap *.prz
exc assets.prz
:end

<Lotus WordPro Documents>
trg wordpro\docs\
cap work\wordpro\*.*
cap *.lwp
exc crc.lwp Files to exclude :end

*Fig. 5*

DATA MIGRATION TOOL

FIELD OF INVENTION

The present invention relates to a data migration tool.

BACKGROUND OF THE INVENTION

Backup and restore tools are well known. Typically such tools allow a user to explicitly select files and combinations of files and directories which are to be copied from a hard disk, or any storage medium, to a backup store. Usually directory information is maintained within the backup and so the file structure of the backup is either a mirror image of the original or if the directory information is discarded, the backup includes a flat file structure. In any case, the user can again subsequently explicitly select files and/or directories from the backup store and restore these either to the original directories on the backed up hard disk or to user selected locations on either the backed up hard disk or another hard disk.

This selectivity largely enables users to separate hard-to-replace user generated data files from more easily replaced licensed software which can be re-installed from original media and so reduces the amount of data being backed up to a minimum with commensurate cost savings.

However, the number of applications running on any given machine is increasing over time and such applications are used in more varied combinations with more than one type of data. For example, one user may simply use a browser to view HTML, BMP, JPEG, WAV or TXT files, whereas another user may use different applications to either view or edit other combinations of such files. This means that along with the fact that users tend to store their data files in idiosyncratic structures anyway, the same files are not always associated with the same applications and so users tend to think about where their files might be located differently.

So, even when machines within an organization are initially set up in exactly the same way, over time different users configure their machines differently and add different applications which in turn are used differently. When an organization is faced with the task of, for example, upgrading or migrating machine operating systems and or application suites, the conventional solution is to backup a user's data files, re-format the machine's hard disk, install the new software and then restore the user's data files. It is, however, extremely difficult to apply the same selection criteria for backing up different user's data. Also, conventional backup and restore tools don't take the specific problems of data migration into account. For example, it is likely that the migrated machine's file structure will correspond little with the original disk and so it is usually not possible to restore all backed up files to corresponding directories. It should, however, be possible for users to intuitively access files on the migrated machine, and so files cannot be simply dumped onto the migrated machine when no suitable location can be found.

Conventional solutions however can only either dump files without corresponding directories onto the migrated machine or the operator must manually determine where the files must go. This means that either the migration process does not produce a desirable result or it uses operator time inefficiently.

SUMMARY OF THE INVENTION

The present invention provides a data migration tool cooperable with configuration means defining, for one or more products, one or more criteria for files to be captured to a backup store from a machine to be migrated, an indication of where said files should be stored in said backup store and any criteria for files to be excluded from said backup store, said tool comprising: means for scanning a storage medium for said machine to be migrated and retrieving one or more file names; and capturing means, responsive to file names fitting any product exclusion criteria, for skipping said files and, responsive to file names fitting any one of said one or more product capture criteria, for capturing said files to said backup store according to said indication of where said files should be stored.

The invention provides a tailored approach to data migration, enabling a user to define a product based approach to archiving data, rather than the one to one selection and mapping approach of conventional backup and restore tools. The invention also provides for restoring information to a migrated machine so that data is accessible in an intuitive manner to the user.

Preferably, the tool is implemented in a platform independent language such as JAVA, enabling the tool to run across multiple platforms.

BRIEF DESCRIPTION OF THE DRAWINGS

An embodiment of the present invention will now be described, by way of example, with reference to the accompanying drawings, in which:

FIGS. 5, 6 and 7 illustrate a sample capture script, a pre-migration file structure and a post-migration file structure operated on by the tool of FIG. 1.

DESCRIPTION OF THE PREFERRED EMBODIMENTS

Figure 1:
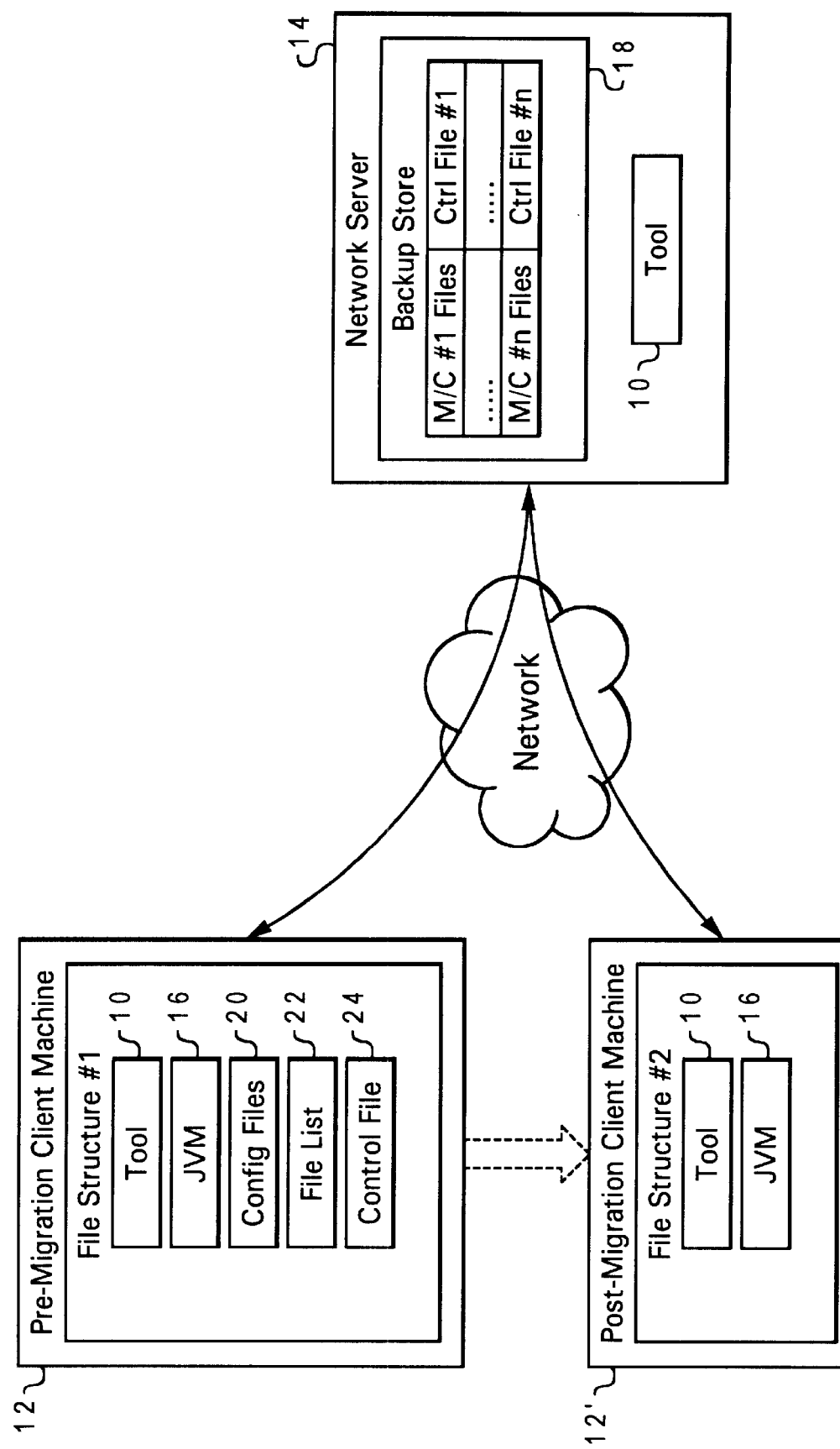
FIG. 1 is a schematic diagram of a machine showing files to be migrated with a tool according to a preferred embodiment of the invention and connected to a server back-up store.
Figure 6:
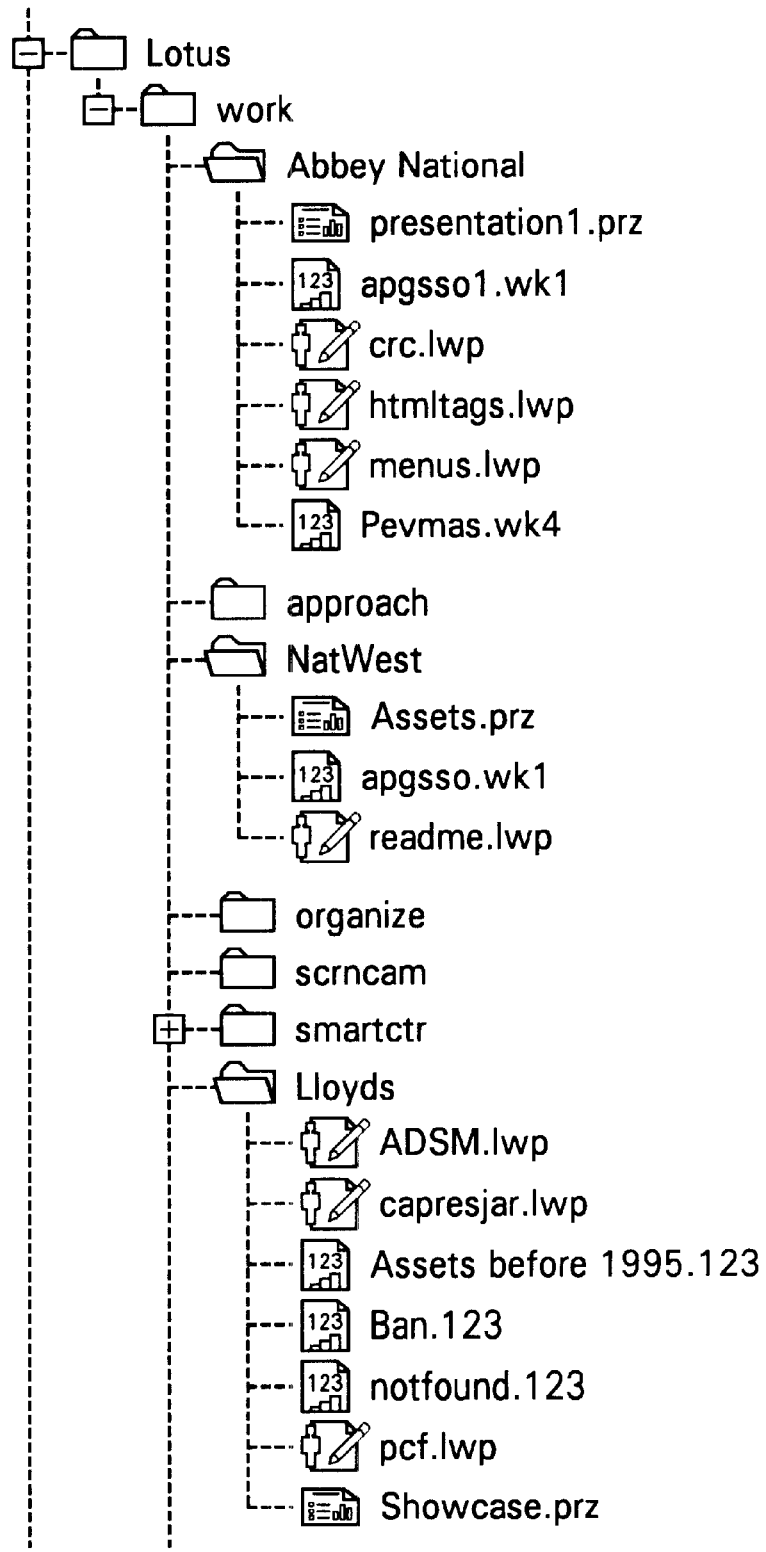

Referring now to FIG. 1, the preferred embodiment of the invention is described in terms of a GUI JAVA-based tool 10 which first captures data having a file structure #1 stored on a pre-migration client machine 12 hard disk. FIG. 6, shows an extract from a typical file structure, where it will be seen that a user stores their data files in project directories where the file types are indicated according to product type suffixes or icons. In the examples given, most users would use the same program to open a given file, say LOTUS 123 to open a spreadsheet file. It will be seen, however, that for example .TXT or .DOC files different users may employ different files. Alternatively, other users may in fact store their data files within program directories, according to project, while others may operate a hybrid scheme.

In FIG. 1 the tool 10 is resident on the machine 12 and runs within a JAVA Virtual Machine (JVM 16 also resident on the machine 12. The tool copies the data from the machine 12 across a network to a location associated with the machine within a backup store 18 located on a server 14.

Figure 2:
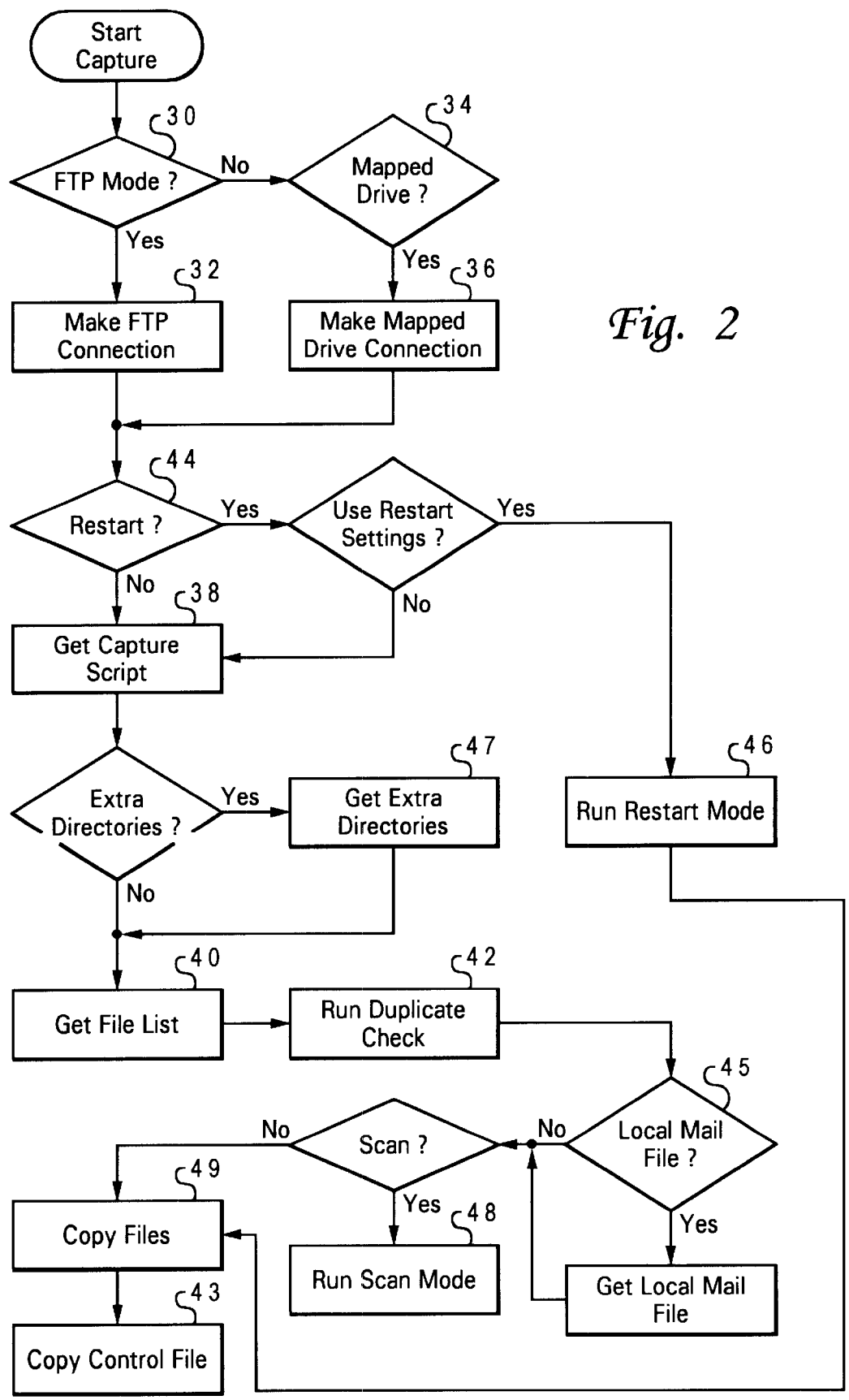
FIG. 2 is a flow diagram illustrating the operation of a file capture process performed by the tool of FIG. 1.

Referring now to FIG. 2 which illustrates the capture process in general, the tool can use a number of modes for connecting the machine 12 to be migrated to the backup store 18 including FTP and network connection.

When an FTP Connection is specified by the user through the tool GUI, step 30, the tool checks the connection is valid before the capture/restore continues, step 32, and the FTP connection is used during the file copy. Passive FTP is preferably used, as this guarantees better file integrity and program control of the entire process.

If a network connection is specified by the user again through the tool GUI, step 34, then a mapped network drive is setup, step 36. Network drives can be setup using any platform specific methodology, and the tool can write to an NFS mounted drive as well as any Netbeui configured drive. If the operating system can see and write to the drive then the tool shows that drive in it's GUI interface.

The tool may alternatively be adapted to copy data to a local backup store, for example, a tape drive or any other archive drive. It will also be seen, that the tool 10 could just as easily be resident on the server 14 and that this would prevent the tool being wiped out in the migration of the machine 12, FIG. 1. The tool 10 could also be adapted to run from within a server JVM and all such variations in configuration are to be considered within the scope of the invention.

When performing a capture, the tool is capable of running in one of three different configurations.

The first mode of operation is just a straight forward capture where the tool copies data to the server 14 based on one of a pair of configuration files 20 located on the machine 12, step 38, FIG. 2. The files 20 comprise scripts which list information defining the files to copy, where to copy them, files not to copy and directories not to copy. (The files 20 may be located anywhere so long as they are identified with the machine 12.) In the preferred embodiment, one configuration file comprises a capture script which is used when scanning a selected capture drive for the data files to copy, step 40. The operation of this step is explained in more detail in relation to FIG. 3. But for the moment, it is sufficient to take it that after the file scan step 40 is complete, a list of files 22 to be captured is produced. The file list 22 contains a number of attributes for each file including the file source, file destination, file size and date.

In the preferred embodiment, the tool further allows a user to add files to the list 22 that are not caught by the capture script by providing an extra directories dialog which prompts the user to add directories for the capture, step 47. When the users chooses to add a directory to the capture it should be on the same drive(s) that have been selected for capture or it will not be added to the capture. Again files within these extra directories are added to the file list 22.

The tool can also be adapted to take into account special directories or files in use throughout an organization. In the preferred embodiment (step not shown), the tool is programmed to look for specified special case directories, for example in IBM a "$user" sub-directory sought. Any file placed within such special directories or their sub-directories will be added to the file list and copied. Thus, a user placing a file in such a special directory can guarantee that it will be included in the migrated data.

Examples of special files include mail files, and again the tool is programmed to look for such files, step 45. Where a client machine includes a LOTUS NOTES client, the file notes.ini indicates the LOTUS NOTES data directory and the file name of the name of the local mail file, and this can be added to the file list 22 for later capture. (Only if the notes.ini has the data directory and file name is it considered valid.)

The tool then checks all of the files in the list 22 to make sure that there are no duplicate file destination attributes, step 42. The renaming process is required as, in some instances, the configuration file causes the tool to throw away pathing information, allowing two files with the same name (but different pathing information) to be copied to the same target directory. In any case, if the tool discovers a duplicate then the file is renamed.

In any case, the final file list is then used to perform the data copy, step 49. While files are being copied it is possible to skip files, allowing the operator to manually choose not to copy a particular file. An example of this usage would be if a very large unwanted file was being copied, the operator can press the skip button and the file will be removed from the data copy. Once all files have been copied to the backup store 18, the tool then writes the file list 22 to the control file 24 which is also copied to the backup store 18 where it is associated with the machine's files, step 43.

The second mode is "Restart" mode. The tool of the preferred embodiment has the ability to be stopped by the operator during a capture. The tool checkpoints it's status when stopped and saves the checkpoint data to the machine hard drive in a control file 24, FIG. 1. It is the file list 22 creating during the file scan, step 40, that is checkpointed should the capture process be stopped by user intervention—essentially the control file 24 comprises a non-volatile version of the file list 22 plus an indicator of the file currently being copied. When the tool is re-launched at a later date, the operator is asked if the settings imported from the control file 24 should be used to continue capture, step 44. If so, then the tool picks up the checkpoint data stored in the control file 24, restores the file list 22, and carries on from where it left off, step 46. The data copy only copies files that had not been copied up to the point that the previous capture was stopped. If the operator running the capture chooses not to use the restart information then the tool starts from the beginning again by proceeding to step 38. The restart feature is useful in instances where large data copies are being performed and the work may need to be spread across more than one day.

The last mode is "Scan" mode, step 48. The purpose of scan mode is to perform all the work that the tool would normally perform in capture mode but no data is actually copied to the server. This allows the operator performing the capture to ascertain how many files and how much data will be copied by the capture process. The operator receives all the normal reporting information, but without the time delays in actually copying the data. The operator can then make informed decisions as to whether the data will fit onto the back up store 18 on the server and possibly cut down the amount of data to be copied in cooperation with the machine owner.

Once data is captured, the machine 12 can then be reloaded with a new operating system and at this point the tool 10 can be re-installed, if necessary, and then used to restore the data back onto the migrated machine 12' to complete the population of the file structure #2. Once all the data has been captured, the tool 10 can also be used to create reports structured by product showing where the files have been copied. These reports are designed to be used by the machine owner to identify where the files are to be located on the migrated machine 12', although it will be seen that because the location of files is tailored to a user, the eventual location of the files should be largely intuitive.

Figure 7:
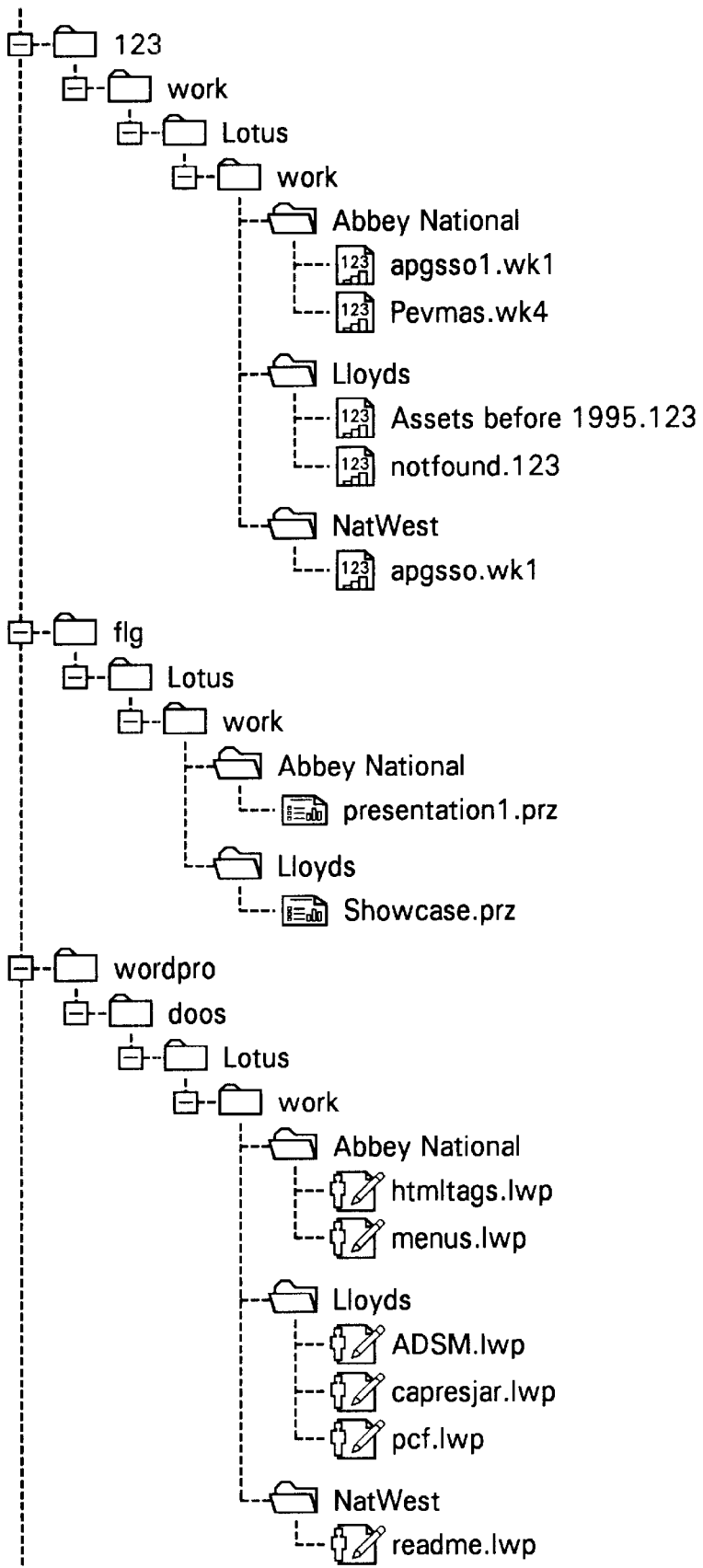

FIG. 7, shows a data file portion of an example migrated file structure #2, where it can be seen that the tool 12 carries out the data migration in a structured manner based around products installed on the machine. Files for a particular product are grouped and captured together under a top level directory, for instance Lotus 123 files are placed in a directory called "\123\work\". Under this top level directory the entire original file path of that file being copied is preferably saved. This is because the name of a file from a user perspective is not the only means of identifying a file and directory structure can form an important part of the file's identification.

In more detail, the first of the two configuration files 20 is a script file called Capture.jav and contains a definition of all of the files to be captured for specified products. The capture script file also contains files to be excluded both locally (just for one product) or globally where the files will be excluded for all products. The capture script also contains the specification of the "top level" directories and whether pathing information should be saved with the files to be copied.

FIG. 5 shows an example of a capture script file. Each line of the capture script file (capture.jav) is broken down using the following different prefixes:

CAP indicates a criterion for files or directories to capture, for example, CAP *.LWP If following CAP there is a \ then the files or directories searched for must be off the root directory of the drive.

If following CAP there is no \ then the files or directories are searched for anywhere on the capture drive, for example, CAP\notes\*.* causes the tool to only look for the \ notes directory off the root drives specified in the GUI and copies files from the notes directory or any directory inside of the \ notes directory. However CAP notes\*.* causes the tool to look for a notes directory anywhere within the directory structure and copy from it or any sub-directory.

TRG indicates the target of the captured files or directories, for example, TRG\WORDPRO\DOCS—this is what is referred to as a "top level" directory.

If following TRG there is a \ then the directory structure is not saved with the file.

If following TRG there is no \ then the directory structure is saved with the file.

EXC indicates a criterion for local files to exclude, for example, \LOTUS\WORD\PRO\WELCOME.LWP

GEXC

Indicates a criterion for global excluding a file or directory, for example, \LOTUS\WORD\PRO\TOUR\

Extra directories specified in step 47, FIG. 2, are preferably affected by the global excludes in the capture script file as this stops unwanted file types from getting copied even in a user added directory. Local excludes only ever affect the product for which they have been specified and therefore have no bearing on the extra directory handling.

Each section of the capture script file is broken down by application name e.g. LOTUS WORDPRO. So only the EXC files for that application are excluded. Whereas the GEXC files are excluded throughout the drive to be captured.

Figure 3:
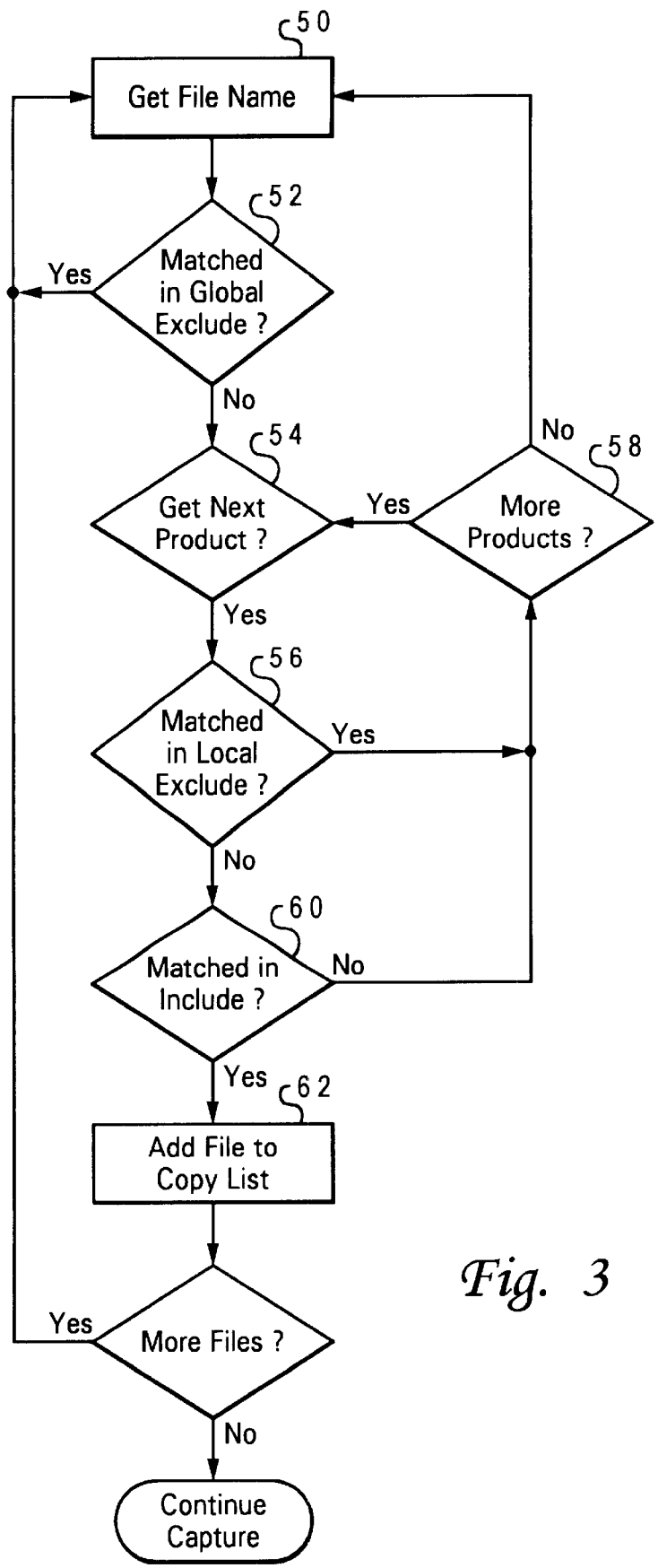
FIG. 3 is a flow diagram illustrating the building of a list of files to be captured by the tool during the process of FIG. 2.

FIG. 3 shows how, using the capture script file, the tool produces the list of files 22 to capture from the selected capture drive. To build this list, the tool searches through each file name on the drive. Starting from the root directory the tool gets the name of each file, step 50, and compares it first against files or directories to be globally excluded, step 52. If globally excluded, the tool gets the next file. If not globally excluded, the tool gets the next product section of the script file, step 54, and for this product first determines if the file is to be locally excluded, step 56. If so, the tool carries on to the next product to determine if the file is to be included for another product. If no more products are available, step 58, the file will not be captured. If the file is not excluded for a product, then the tool checks if the file is to be captured by examining the CAP parameters for a product, step 60. If so, then it is added to the file list, step 62, and if not, the tool carries on to the next product. In adding the file to the file list, the tool calculates the file destination attribute according to the TRG parameter specified for the product. So if a product had a TRG parameter of WORDPRO\DOCS, and a file \WORK\123\mywork.123 were to be captured, the file destination would be \WORDPRO\DOCS\WORK\123\mywork.123. If the TRG parameter were \WORDPRO, the file destination would be \WORDPRO\mywork.123.

In any case, it can be seen that in the preferred embodiment, it has been seen to be advantageous to give exclusion parameters priority over capture parameters although it will be seen that the invention is not limited to such a priority scheme.

Restore.jav is a second script file and is used for file redirection, that is, during restoration, specified files can be redirected to alternative locations rather than staying within the "top level" directory structure, for example, the file Bookmarks.htm contains bookmarks for a browser and so needs to be copied into a specific browser sub-directory. In this case, redirection is useful as the browser on the migrated machine 12' may be different from the browser on the pre-migration machine 12.

The restore script file is broken down into paired criteria as follows:

FIL identifies a specific file name to be re-directed, for example, Bookmark.htm; and

LOC indicates the target location on the migrated machine of the file specified by the FIL parameter, for example, \program files\netscape . . .

TRG indicates a captured data directory, for example, \NOTES\MYDATA; and

REP indicates a target directory on the migrated machine for restored files in the directory indicated by the TRG parameter, for example, \NOTES\DATA Files that do not appear in the restore script are a placed on the restore drive using default settings. That is, they are mapped with the same path information they were captured with. Thus, the restore.jav script exists to allow redirection of files to places on the hard drive other than the top level directories.

Figure 4:
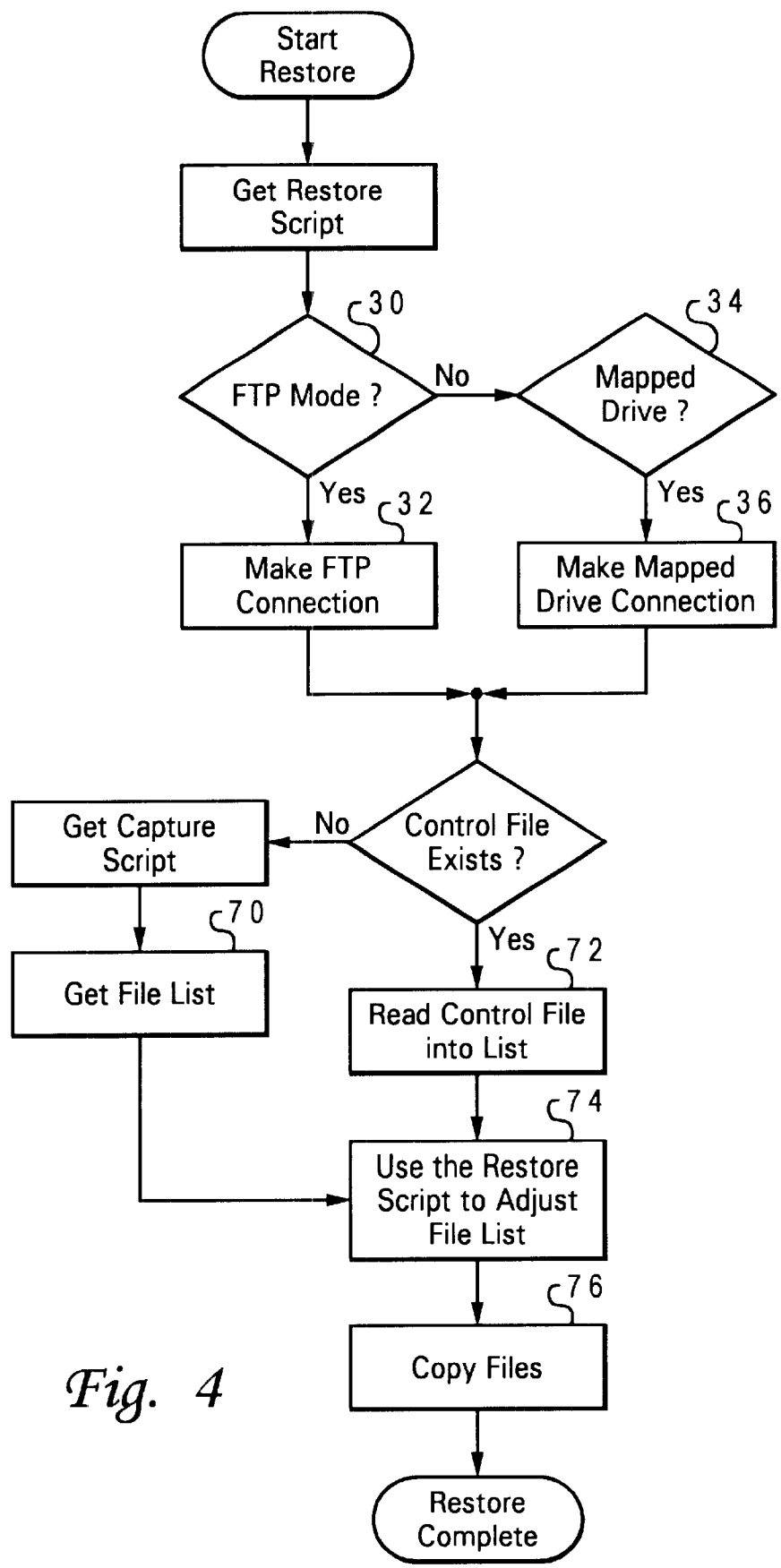
FIG. 4 is a flow diagram illustrating the operation of a file restore process performed by the tool of FIG. 1.

Referring now to FIG. 4, the tool has the ability to restore from a network connection or from an FTP Server as in steps 30 to 36 of the capture process.

The control file 24, copied to the backup store after the capture process, contains all of the information the tool needs about the files to be restored. If the control file isn't available (if it has been lost or corrupted) then, if the capture script file is available, it can be run over the backup store copy of the files captured from the machine in the same manner as step 40 of the capture process to generate a file list, step 70. This will not detect files captured from extra directories specified in step 47 of the capture process, and so the operator is allowed to restore such files manually. If the control file exists, it is simply read into memory to generate the file list 22, step 72. The tool then traverses the file list applying the restore script criteria to adjust the file list, step 74. During the restore process, the file source attribute information is not needed and the file destination attribute corresponds to the default file location on the migrated machine. Thus, the file source information can be wiped and overwritten with a copy of the file destination attribute or a further migrated machine destination attribute can be added to the file list. If a file is to be re-directed the file source attribute or migrated machine destination attribute can be updated accordingly.

Once the file list has been completed, the files are copied as in step 49 of the capture process, step 76.

Preferably, both the capture and restore processes include error checking to make sure that the file is copied and restored correctly. At capture time the tool records the size and file date from the file being copied and this is placed in the control file 24. Should a file not copy successfully the tool retries the operation three times before giving up and flagging the file as in error. At restore time the tool uses the information from the control file to check file sizes and dates, therefore, if the file has been modified in any way on the server, the tool will flag it as an invalid file and refuse to copy it. This process guarantees to the user that their files have not been modified in any way since being copied from their machine.

It will be seen that, since the capture process in a preferred embodiment of the tool guarantees to capture all files stored in special directories such as a "$user" directory, the restore process could usefully be adapted to copy all top level directories into the $user directory rather than the root directory of the migrated machine. This lessens the processing required of later capture and restore processes should the machine 12' need to be migrated again as the files within such special directories are guaranteed to be migrated.

It should be seen that while the preferred embodiment has been described in terms of a tool cooperable with script files, the product based criteria for capturing files (or not) and restoring files could be input via a GUI and stored in a dedicated format, rather than manually generating script files.

What is claimed is:

1. A data migration tool cooperable with configuration means defining, for one or more products, one or more criteria for files to be captured to a backup store from a machine to be migrated, an indication of where said files should be stored in said backup store and any criteria for files to be excluded from said backup store, said data migration tool comprising:

means for scanning a storage medium for said machine to be migrated and retrieving one or more file names;

capturing means, responsive to file names fitting any product exclusion criteria, for skipping said files and, responsive to file names fitting any one of said one or more product capture criteria, for capturing said files to said backup store according to said indication of where said files should be stored; and a script file divided into one or more product sections, each said product section including said product capture and exclusion criteria and said file storage indication.

2. The data migration tool according to claim 1 wherein said product exclusion criteria take priority over said product capture criteria.

3. The data migration tool according to claim 1 wherein said capturing means is adapted to generate a list of files to be captured, each entry in said list comprising a destination attribute indicative of where an associated file should be stored in said backup store, said capturing means being adapted to read said list and to copy each file in said list to a location indicated by its associated destination attribute in said backup store.

4. The data migration tool according to claim 1 wherein said configuration means defines one or more global exclusion criteria for files to be excluded from said backup store, and wherein said capturing means is responsive to file names fitting any one of said one or more global exclusion criteria, for skipping said files.

5. The data migration tool according to claim 3 wherein said one or more of said capture criteria define whether or not file pathing information should be captured and wherein said tool further comprises means for checking said file list for duplicate destination attributes, responsive to detecting duplicate destination attributes, for adjusting one of said destination attributes.

6. The data migration tool according to claim 3 wherein said tool is further operable in a scan mode in which said capturing means is adapted to populate each entry in said file list with a file size, wherein said copying of files to said backup store is selectively disabled and wherein said tool comprises means for assessing the storage space required for said files in said file list.

7. The data migration tool according to claim 3 wherein said tool is operable in a restart mode and comprises:

means, responsive to user interaction, to copy said file list to non-volatile storage and to store a checkpoint indicator of the last file to be copied to said backup drive; and means for reading said file list from non-volatile storage and said checkpoint indicator before resuming copying of said files to said backup store.

8. The data migration tool according to claim 1 further comprising means for restoring files from said backup store to a migrated machine according to the files' location in said backup store.

9. The data migration tool according to claim 8 wherein said configuration means comprises means defining one or more criteria for files to be re-directed on restoration to said migrated machine, said restoring means being responsive to file names fitting any one of said one or more re-direction criteria for restoring said files accordingly.

10. The data migration tool according to claim 3 wherein said tool comprises means, responsive to user interaction, for defining one or more files to be added to said file list.

11. The data migration tool according to claim 1 wherein said tool is adapted to capture pre-determined files regardless of said capture and exclusion criteria.

12. The data migration tool according to claim 1 wherein said backup store is one of a local backup storage medium or a remote backup storage medium.

13. The data migration tool according to claim 12 adapted to connect to a remote backup storage medium via one of an FTP connection or a mapped drive connection.

14. The data migration tool according to claim 1 wherein said tool is adapted to operate from one of a machine to be migrated or a remote server connected to a machine to be migrated.

15. A method operable in a data migration tool, said method comprising:

defining, for one or more products, one or more criteria for files to be captured to a backup store from a machine to be migrated, an indication of where said files should be stored in said backup store and any criteria for files to be excluded from said backup store;

scanning a storage medium for said machine to be migrated and retrieving one or more file names; and responsive to file names fitting any product exclusion criteria, skipping said files;

responsive to file names fitting any one of said one or more product capture criteria, capturing said files to said backup store according to said indication of where said files should be stored; and dividing a script file into one or more product sections, each said product section including said product capture and exclusion criteria and said file storage indication.

16. An article of manufacture comprising a computer usable medium having computer readable program code means embodied therein for migrating files to a backup store, the computer readable program code means in said article of manufacture comprising computer readable program code means for causing a computer to effect the steps of claim 15.

17. A program storage device readable by machine, tangibly embodying a program of instructions executable by the machine to perform method steps for migrating files to a backup store, comprising the steps of claim 15.

18. A computer program product comprising a computer usable medium having computer readable program code means embodied therein for migrating files to a backup store, comprising the steps of claim 15.

19. A data migration tool cooperable with configuration means defining, for one or more products, one or more criteria for files to be captured to a backup store from a machine to be migrated, an indication of where said files should be stored in said backup store and any criteria for files to be excluded from said backup store, said data migration tool comprising:

a JAVA class;

means for scanning a storage medium for said machine to be migrated and retrieving one or more file names;

capturing means, responsive to file names fitting any product exclusion criteria, for skipping said files and, responsive to file names fitting any one of said one or more product capture criteria, for capturing said files to said backup store according to said indication of where said files should be stored; and a script file divided into one or more product sections, each said product section including said product capture and exclusion criteria and said file storage indication.

\* \* \* \* \*